(12) United States Patent
Gafni

(10) Patent No.: US 9,457,535 B2
(45) Date of Patent: Oct. 4, 2016

(54) STRUCTURAL ELEMENT COMPRISING CARDBOARD

(71) Applicant: I.G. CARDBOARD TECHNOLOGIES LTD., Tel Aviv (IL)

(72) Inventor: Izhar Gafni, Ahituv (IL)

(73) Assignee: I.G. CARDBOARD TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 14/806,429

(22) Filed: Jul. 22, 2015

(65) Prior Publication Data

US 2015/0328856 A1    Nov. 19, 2015

Related U.S. Application Data

(60) Division of application No. 14/632,978, filed on Feb. 26, 2015, which is a continuation of application No. PCT/IL2013/050821, filed on Oct. 13, 2013.

(60) Provisional application No. 61/715,359, filed on Oct. 18, 2012, provisional application No. 61/787,229, filed on Mar. 15, 2013.

(51) Int. Cl.
*B31F 5/00* (2006.01)
*B62K 19/08* (2006.01)
(Continued)

(52) U.S. Cl.
CPC ............ *B31F 5/005* (2013.01); *B32B 3/12* (2013.01); *B32B 21/06* (2013.01); *B32B 29/005* (2013.01);
(Continued)

(58) Field of Classification Search
CPC .......... B31F 5/005; B62K 19/08; B65D 2585/6862; B65D 2581/02; B32B 21/06; B32B 29/005; B32B 29/08; B32B 3/12; B32B 2307/3065; B32B 2307/584; B32B 2307/7265; B32B 2605/00; Y10T 156/1051
See application file for complete search history.

(56) References Cited

U.S. PATENT DOCUMENTS 2,284,333 A    5/1942    McGirl et al.
2,393,776 A    1/1946    Horr
(Continued)

FOREIGN PATENT DOCUMENTS

CN    2541301 Y    3/2003
CN    1950247 A    4/2007
(Continued)

OTHER PUBLICATIONS

Viva Sarah Press; "Nimrod Elmish Interview—Cardboard wheelchair to roll out from Israel"; Israel 21c; Published: Oct. 28, 2012 (http://www.israel21c.org/cardboard-wheelchair-to-roll-out-from-israel/).

(Continued)

*Primary Examiner* — Michael C Miggins
(74) *Attorney, Agent, or Firm* — Kenealy Vaidya LLP

(57) ABSTRACT

The invention provides structural elements comprising an elongated internal member and an elongated external member enclosing said internal member, in which a mid-portion enveloping the internal member and being in tight association with the external surface of the internal member, defines, jointly with said internal member, a first, core-envelope sub-structure, while two flanking portions extending from and integral with the mid-portion and facing and contacting one another to jointly define a second, layered sub-structure. The invention further provides methods for manufacturing such structural elements.

11 Claims, 5 Drawing Sheets

(51) Int. Cl.
   *B32B 21/06* (2006.01)
   *B32B 29/00* (2006.01)
   *B32B 29/08* (2006.01)
   *B32B 3/12* (2006.01)

(52) U.S. Cl.
   CPC ............... *B32B 29/08* (2013.01); *B62K 19/08* (2013.01); *B32B 2307/3065* (2013.01); *B32B 2307/584* (2013.01); *B32B 2307/7265* (2013.01); *B32B 2605/00* (2013.01); *B65D 2581/02* (2013.01); *B65D 2585/6862* (2013.01); *Y10T 156/1051* (2015.01)

(56) References Cited

U.S. PATENT DOCUMENTS

| | | |
|---|---|---|
| 2,997,266 A | 8/1961 | Munroe |
| 3,492,016 A | 1/1970 | O'Connor et al. |
| 3,708,101 A | 1/1973 | McDanield |
| 3,734,389 A | 5/1973 | Brown |
| 4,003,155 A | 1/1977 | Raskin |
| 4,303,020 A | 12/1981 | Houle |
| 4,399,915 A | 8/1983 | Sorenson |
| 4,657,795 A | 4/1987 | Foret |
| 4,771,893 A | 9/1988 | Liebel |
| 4,790,546 A | 12/1988 | Mendenhall |
| 5,240,267 A | 8/1993 | Owsen |
| 5,318,742 A | 6/1994 | You |
| 5,397,146 A | 3/1995 | Fischer |
| 5,540,485 A | 7/1996 | Enders |
| 5,996,510 A | 12/1999 | Harpman et al. |
| 6,109,638 A | 8/2000 | Colegrove |
| 6,817,621 B2 | 11/2004 | Varan |
| 7,014,046 B2 | 3/2006 | Niu et al. |
| 7,137,517 B2 | 11/2006 | Lowry et al. |
| D537,758 S | 3/2007 | Grepper |
| D561,649 S | 2/2008 | Latham |
| D567,149 S | 4/2008 | Grepper |
| 8,191,931 B1 | 6/2012 | Mulder |
| 8,286,974 B2 | 10/2012 | Chen et al. |
| D671,173 S | 11/2012 | Tompkin |
| 2003/0111383 A1 | 6/2003 | Qiu et al. |
| 2003/0197346 A1 | 10/2003 | Singenberger et al. |
| 2004/0119330 A1 | 6/2004 | Chuang |
| 2005/0008817 A1 | 1/2005 | Rodriguez et al. |
| 2006/0207481 A1 | 9/2006 | McCarthy |
| 2007/0262558 A1 | 11/2007 | Segato |
| 2009/0123770 A1 | 5/2009 | Melville |
| 2010/0148460 A1 | 6/2010 | Nelson et al. |
| 2011/0133427 A1 | 6/2011 | Bashan |
| 2012/0187650 A1 | 7/2012 | Chen et al. |
| 2013/0277934 A1 | 10/2013 | De Roeck |

FOREIGN PATENT DOCUMENTS

| | | |
|---|---|---|
| CN | 201080232 Y | 7/2008 |
| CN | 103144828 A | 6/2013 |
| CN | 203739534 U | 7/2014 |
| DE | 202013000837 U1 | 2/2013 |
| ES | 1074812 U | 6/2011 |
| GB | 2080767 A | 2/1982 |
| JP | S1316852 | 11/1938 |
| JP | 60195769 U | 12/1985 |
| JP | H05170264 A | 7/1993 |
| JP | H8-91046 A | 4/1996 |
| JP | H8-133340 A | 5/1996 |
| JP | H10119965 A | 5/1998 |
| JP | 3058543 U | 6/1999 |
| JP | H11210130 A | 8/1999 |
| JP | H11-240533 A | 9/1999 |
| JP | 2000129599 A | 5/2000 |
| JP | 2001030377 A | 2/2001 |
| JP | 3102634 U | 7/2004 |
| JP | 2005512900 A | 5/2005 |
| JP | 3696756 B2 | 9/2005 |
| JP | 2009061603 A | 3/2009 |
| JP | 2013527066 A | 6/2013 |
| WO | 2011/067742 A1 | 6/2011 |

OTHER PUBLICATIONS (Video, two Internet addresses are provided) Design Hobby: "Ridable Cardboard Bicycle" (Izhar Gafni), 2012 (accessible at 'http://www.shejipi.com/9665.html', or 'http://v.youku.com/v_show/id_XNDM2MzE0Mzlw.html'.

STRUCTURAL ELEMENT COMPRISING CARDBOARD

CROSS REFERENCE TO RELATED APPLICATION

This application is a divisional of U.S. patent application Ser. No. 14/632,978 filed on Feb. 26, 2015, which is a continuation of PCT Patent Application No. PCT/IL2013/050821, filed on Oct. 13, 2013 which claims the priority benefit under 35 U.S.C. §119 of U.S. Provisional Application No. 61/787,229 filed Mar. 15, 2013 and U.S. Provisional Application No. 61/715,359 filed Oct. 18, 2012, the entire contents of which are hereby incorporated in their entireties by reference.

TECHNOLOGICAL FIELD AND BACKGROUND

The present invention relates to structural elements, in particular elongated load-bearing elements, comprising cardboard.

WO11067742 discloses a human-powered land vehicle sufficiently rigid so as to transport a human rider. The vehicle is constructed from pulpably recyclable and shreddably recyclable materials.

GENERAL DESCRIPTION

The present invention is based on the realization that appropriately formed cardboard may be shaped into elongated (e.g. rod-like or beam-like) structural elements that may be used in frames, such as, but not limited to, bicycle frames. In accordance with the invention, the cardboard so formed may be a cardboard sheet of the kind used in packaging or shipping, such as a cardboard sheet having an internal layer of a compressible cellular structure (e.g. formed to have a plurality of cells, for example, prismatic cells formed by intersecting cardboard strips, honeycombed-shaped cells, corrugated cardboard, corrugated fiberboard etc.) with an overall relatively low density that is sandwiched between two substantially planar layers. The sheet may be single-walled or multi-walled cardboard sheet and may be of the kind known in the art.

The term "corrugated cardboard" refers herein to a heavy-duty paper of various strengths, ranging from a simple arrangement of a single thick sheet of paper to complex configurations featuring multiple corrugated and uncorrugated layers.

The term "corrugated fiberboard" refers herein generally to a paper-based material consisting of a fluted corrugated sheet and one or two flat linerboards. Such material is widely used in the manufacture of corrugated boxes and shipping containers.

The invention provides, by a first of its aspects, a structural element comprising an elongated internal member and an elongated external member enclosing said internal member. The internal member has an external surface with a rounded circumference, e.g., circular circumference. The external member is made of cardboard and is shaped to have a mid-portion with rounded internal surface enveloping at least a portion of the internal member and in tight association (e.g. glued to) with the external surface of the internal member, defining, jointly with said internal member, a first, core-envelope sub-structure. The external surface of said core-envelope sub-structure may be rounded or may have other contours, particularly where the tight association of its internal surface to the external surface of said internal member is carried out in a mold where the outer contours will be shaped by the mold. The external member further has two flanking portions extending from and integral with the mid-portion facing and contacting one another to jointly define a second, layered sub-structure. These two integral sub-structures jointly impart a load-bearing or bend-resistance property to the structural element that is significantly larger than that of the internal member, e.g. is at least 2, 5, or even at least 10 folds larger than that of said internal member. In addition, due to non-uniformity of density or fine structure of the two-member structural element, the latter has significantly increased load-bearing or bend-resistance property as compared to a reference structural element having the same length and weight but having single-body configuration with uniformity of density and fine structure.

By some embodiments the external member is configured from a single sheet of cardboard, or from two or more, e.g. stacked cardboard sheets. The cardboard sheet may, by way of non-limited example, be single-walled or multi-walled corrugated cardboard sheet. The configuration may be such that the external member is a single cardboard sheet having portions that are deformed to closely follow the external surface contours of the internal member and are attached thereto and closely follow the external surface contours of the internal member, such portions with said internal member defining said first sub-structure that is integral with the second substructure that is defined by the two opposite flanking portions. Alternatively, the external member may be configured from two cardboards sheets deformed to jointly define opposite (e.g. symmetrical) parts of the external member; e.g. the two parts are mirror images of one another about a longitudinal plane of symmetry, each one defining half of said mid-portion and one, respective, flanking portion.

By a second of its aspects, the invention provides a method for manufacturing a structural element comprising (in the given sequence or in any other): providing (i) an elongated member having a rounded circumference, and (ii) a single- or multi-sheet generally planar cardboard structure having first and second opposite surfaces; forming the cardboard structure to have a mid-portion (namely a portion located somewhere between opposite edges of the structure) wrapped tightly around said elongated member and bringing the first surface of said portion to be in close association with external surface of the elongated member to thereby define a first, core-envelope sub-structure. The flanking portions, namely the portions flanking the mid portion and extend from it towards said opposite edges, define a second, layered sub-structure integral therewith. Typically, the opposite faces of the flanking portions are fixed one to the other. At times also the mid-portion may be fixed to the external surface of the elongated member. The elongated member defines an internal member in the finished element.

By some embodiments, the structural element is configured to have a longitudinal plane of symmetry passing between the two flanking portions. The flanking portions in such embodiments may be fixed to one another at their first faces. By some embodiments the structural element has a different thickness at different portions thereof. Typically where said external member is made of a deformed single-piece cardboard sheet, the sheet has in its original, non-deformed state a given thickness T and after deforming, said rounded portion has at its apex thickness T', smaller than T, and gradually increasing towards said flanking portions that typically have a thickness T.

In particular, during the folding of the cardboard sheet about the elongated member, the cardboard sheet becomes mechanically pressed against the elongated member, thereby partially compressing the internal layer and providing the cardboard sheet with a smaller thickness T' at the rounded portion. This compression of the internal layer likely serves to facilitate a more mechanically robust structure of the structural element.

By some embodiments, the thickness of the layered sub-structure (e.g. a thickness of 2×T) is about the same as the diameter of the core-envelope sub-structure.

By other embodiments, the specific weight of the cardboard structure per unit of surface area within its rounded portion of the core-envelope sub-structure is greater than that of said flanking portions. This may typically be the result of a deformation-induced strain or compression (that may lead to compacting) of the cardboard sheet's interior within the central portion.

By some embodiments, the internal member is made of wood or cardboard.

The structural element may be capable of supporting a load in a direction perpendicular to its longitudinal axis which is at least 10 times the weight of said element.

The structural element defines a body of a given geometry and dimension and may be capable of supporting a load that is at least 10 times greater than the maximum load that can be supported by a reference element being a single part body made of the same material as that of said internal member and having said given geometry and dimension.

By some embodiments the external member at its rounded portion comprises a single layer of cardboard; although by other embodiments the rounded portion may comprise two or more layers of cardboard.

By some embodiments the structural element may comprise one or more reinforcing pins fitted through one or both of the first and second sub-structures. Typically, the one or more pins are fitted through and across the second sub-structure.

By some embodiments the structural element comprises external coating(s), e.g. one or more of fire-resistant coating, liquid-resistant coating, scratch-resistant coating and other environmentally resistant coating(s).

The invention also provides, by another of its aspects, a device comprising one or more of the above structural elements. The device may be a frame for use, for example, in a wheeled vehicle, e.g. a bicycle.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
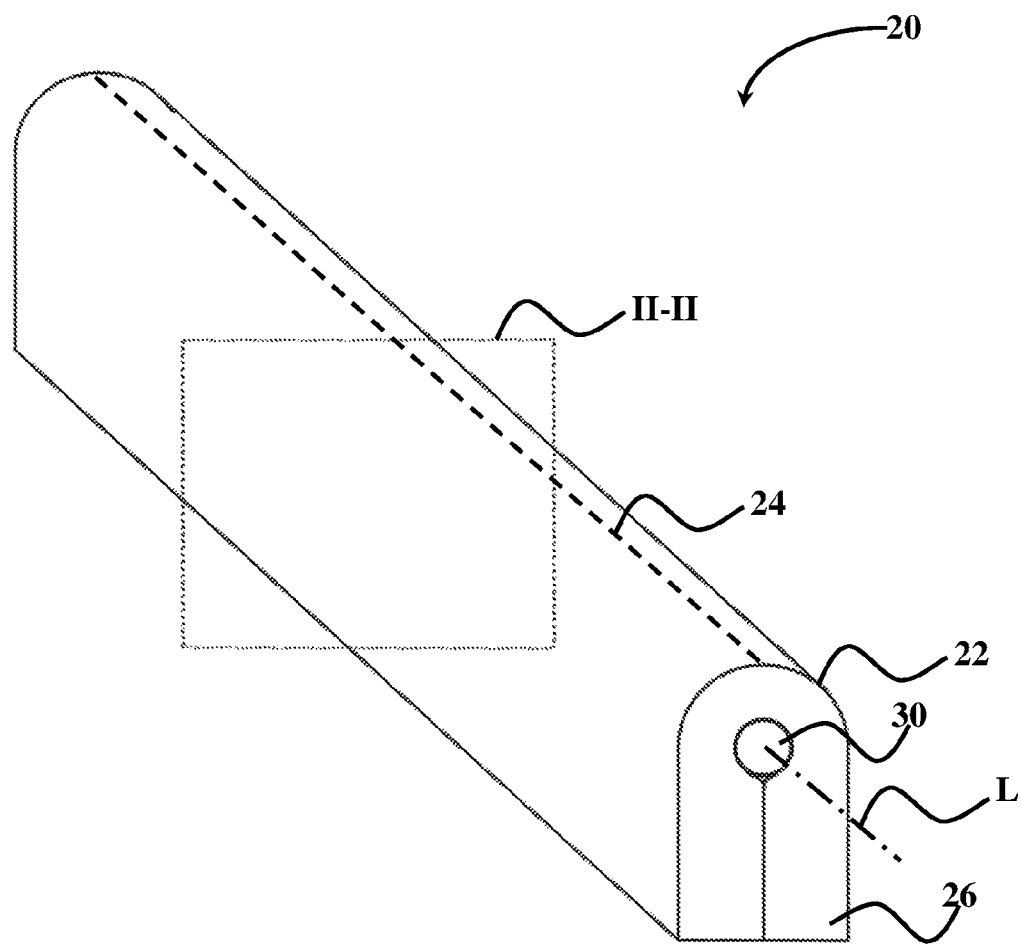
FIG. 1 is a schematic isometric view of a structural element according to the invention.

Reference is made to FIG. 1 showing an elongated structural element 20. The structural element 20 has a longitudinal axis L, a first, upper, rounded sub-structure 22 extending down from an apex 24, and a second, bottom, essentially rectangular sub-structure 26 integral with the first sub-structure 22. The external surface of the elongated structural element 20 is coated by one or more coatings such as a fire-resistant coating, liquid-resistant coating, scratch-resistant coating and other environmentally resistant coating(s).

Figure 2:
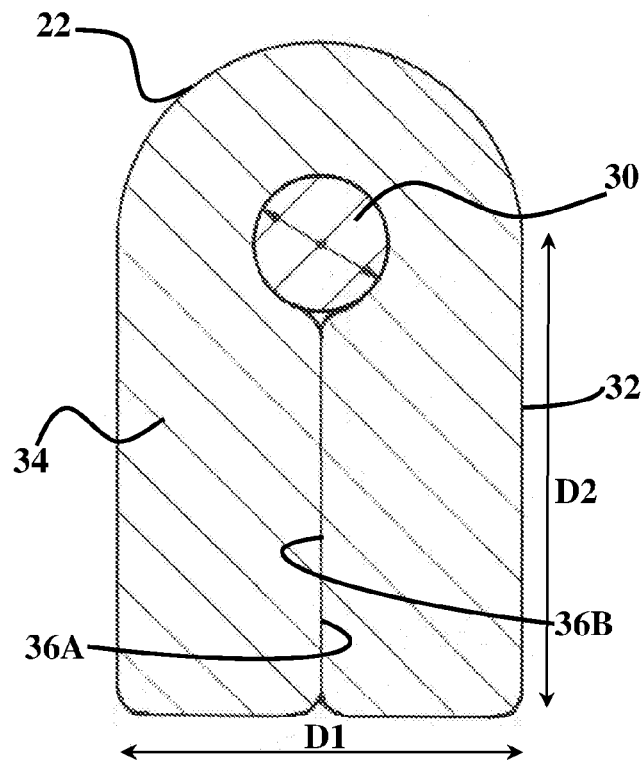
FIGS. 2 and 3 are schematic cross-sectional views of two embodiments of a structural element according to the invention, taken along a plane II-II shown in FIG. 1.
Figure 3:
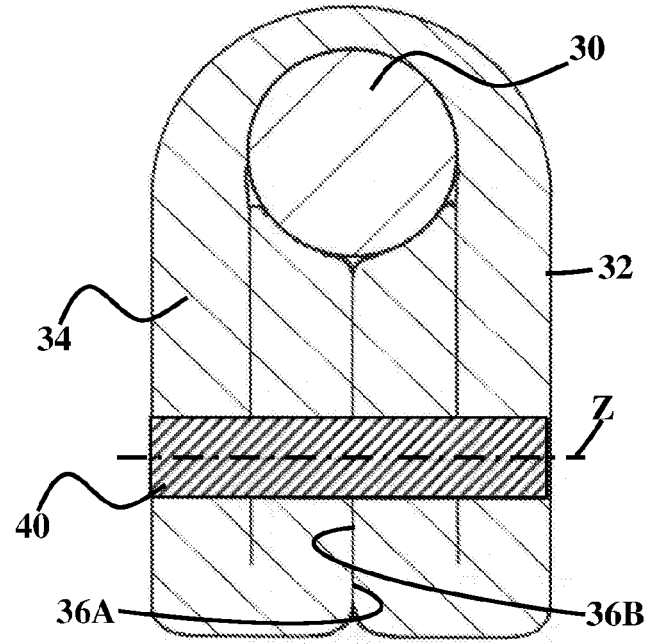

Cross-sections of the structural element in accordance with two examples of the invention are shown schematically in FIGS. 2 and 3, the cross section taken along plane II-II of FIG. 1. In both examples, the structural element 20 includes an elongated internal member 30 and an elongated external member 32 enclosing the internal member 30. The internal member 30 has an external surface, which in this non-limiting exemplary embodiment has a rounded circumference, circular in these specific examples; however other configurations such as oval-, elliptic- or polygonal-like may also be possible. The internal member 30 is typically made of wood or cardboard.

The external member 32 is made of cardboard, which may be single-, double-, or multi-walled corrugated cardboard/fiberboard structure. As can be seen, the external member 32 has in this exemplary embodiment a rounded mid-portion enveloping the internal member 30 and being in tight association with the external surface thereof, and defining, jointly with the internal member 30, the first, core-envelope sub-structure 22. The two flanking portions 34 extend from and are integral with the rounded portion. The flanking portions face and contact one another to jointly define a second, layered sub-structure 26.

In the example of FIG. 2, the flanking portions 34 form a two-layer sub-structure 26, while in the example of FIG. 3 the flanking portions 34 are internally folded to form together a four-layer sub-structure 26. It should be noted that FIGS. 2 and 3 are schematic in nature and the relative dimensions of D1 and D2 (that for simplicity are marked in FIG. 2 only) may be different as shown (e.g. D2 may be relatively longer in comparison to D1 from that shown; etc.). This note on the schematic nature and the relative dimensions applies also to other embodiments illustrated in the drawings.

As further exemplified by the configuration of FIG. 3, but may also be used in other configurations e.g. that of FIG. 2, the structural element may include one or more reinforcing pins such as pin 40. The pin(s) 40 may generally be fitted through the first sub-structure 22 or second sub-structure 26. Typically, as shown in the figure, the pins 40 are fitted through and across the second sub-structure 26.

As can be seen, the flanking portions are symmetrical to one another with respect to a longitudinal plane of symmetry which passes between opposite faces 36A and 36B of the flanking portions 34. The opposite faces 36A and 36B are typically fixed to one another, e.g. by gluing. Also, the opposite surfaces of the rounded portion 22 and the external surface of the member 30 may be appropriately fixed to one another, e.g. by gluing.

Figure 4A:
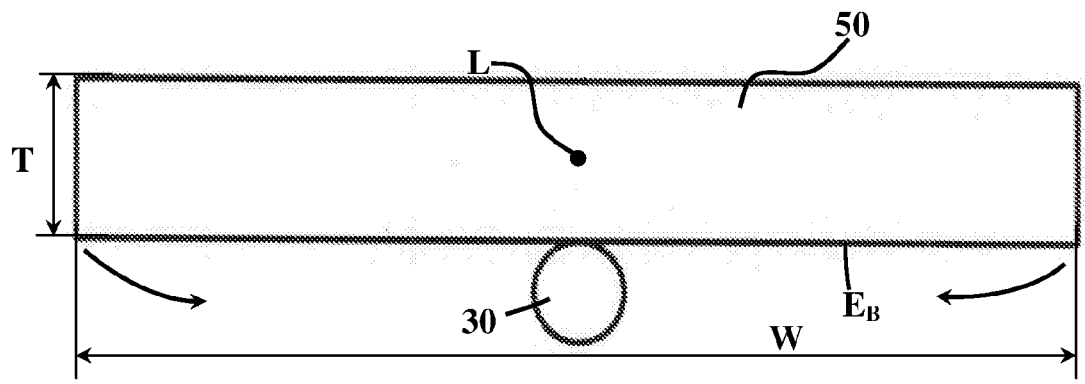
FIGS. 4A-4C illustrate schematically the process of forming the structural element of FIG. 2.
Figure 4B:
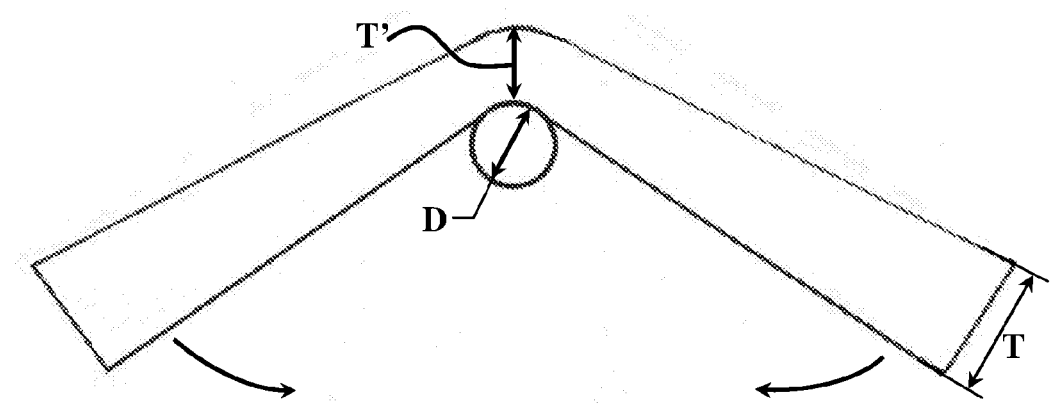
Figure 4C:
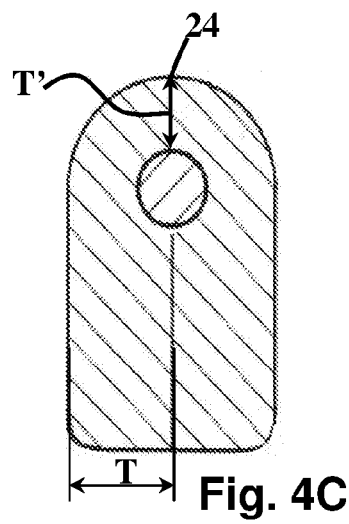

Reference is now being made to FIGS. 4A-4C illustrating, schematically, steps in the process for the manufacture of the structural element of the kind shown in FIG. 2. At a first step shown in FIG. 4A, a corrugated cardboard sheet 50, having a given thickness T, is brought into contact with an elongated member that in the eventual structural element constitutes the internal member 30 and accordingly the same reference number is used to denote this member. Then, as shown in FIG. 4B, the cardboard sheet is deformed by pressing it against member 30 to eventually wrap it as shown in FIG. 4C. The deformation strains the corrugated cardboard sheet 50 and causes it to compress and therefore its thickness changes along the sheet, with the minimal thickness T' being at the apex 24 and gradually increasing towards the edge of the flanking portions which retain the original thickness T. The combination of the two integral sub-structures 22 and 26, with their different configurations, provides for improved mechanical properties including increased load-bearing and bend-resistance capacity of the structural element 20. Typically, these improved properties are also a consequence of the non-uniform density within the structural element resulting from the combination of different members with different densities, and typically also from the non-uniform density along the external member. For example, such improved properties provide for at least 2, 5 or even 10 folds increase of the load-bearing or bend-resistance capacity value as compared to that of a reference structural element, which has the same overall weight and length, but, contrary to the structural element of the invention, has substantially uniform density.

Figure 5:
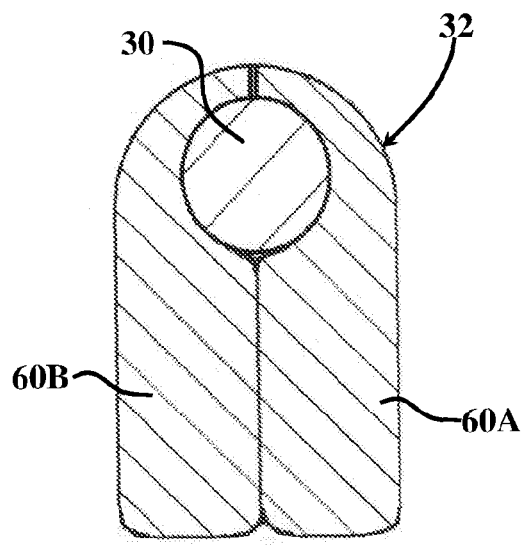
FIGS. 5-7 are schematic cross-sectional views of three more embodiments of a structural element according to the invention.
Figure 6:
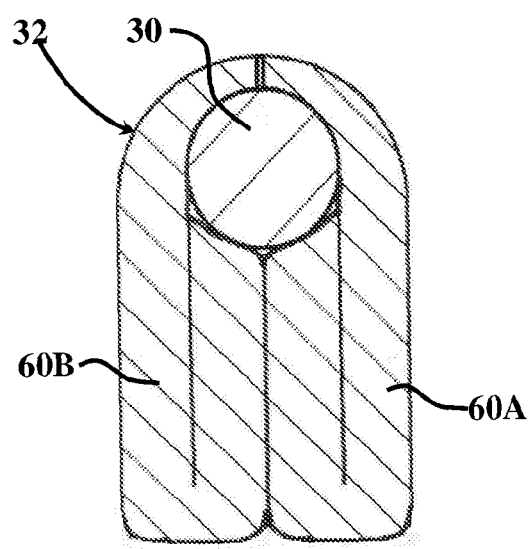
Figure 7:
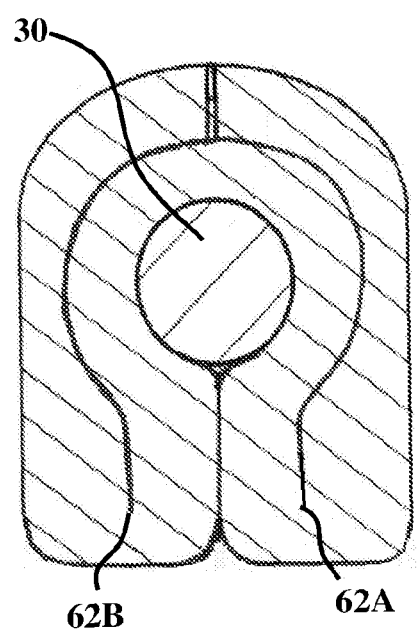

Alternative configurations of the external member 32 are illustrated schematically in FIGS. 5-7. In FIG. 5, the external member 32 is made out of two corrugated cardboard sheets deformed into two opposite parts 60A and 60B of the external member. In FIG. 6, as distinct from the configuration of FIG. 5, the flanking portions are folded in a similar manner as in FIG. 3. In FIG. 7, the cardboard sheet is wrapped twice about the member 30, once in a similar manner as shown in FIGS. 4A-4B, then the flanking portions are folded in the opposite directions at 62A and 62B to form another layer about the member 30.

In the configurations shown in FIGS. 2, 3, 5-7, the cardboard sheet deformed to form the external member 22 may be a single-, double-, or multi-walled corrugated cardboard sheet.

Figure 8:
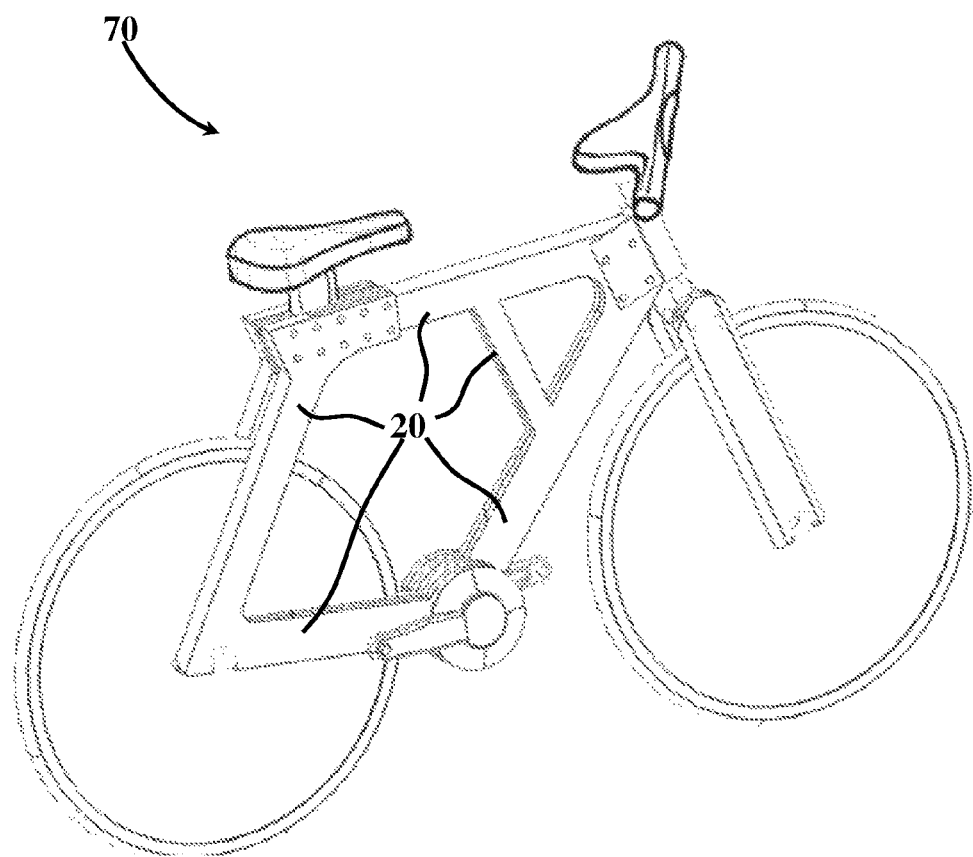
FIG. 8 is a schematic illustration of a frame of a bicycle comprising structural elements according to the invention.

Reference is made now to FIG. 8 exemplifying a part of a bicycle having a frame 70 with a plurality of structural elements 20 configured in accordance with the embodiments of the invention. It should be understood that the structural elements may have the same or different configurations embodying the features of the invention. As can be noted, the structural elements may be configured with different geometries and may also be joined to other elements through gluing, by the use of reinforcing pins or by the use of any other attachment mechanisms.

The invention claimed is:
1. A method for manufacturing a structural element, comprising (in the given sequence or in any other):
    providing (i) an elongated member having a rounded circumference, and (ii) a single- or multi-sheet cardboard structure having first and second opposite surfaces;
    forming the cardboard structure to have a central portion wrapped tightly around said elongated member and with the first surface of said portion in close association with external surface of the elongated member to thereby define a first, core-envelope sub-structure and have flanking portions that are opposite one to the other to define a second, layered sub-structure integral therewith.
2. The method of claim 1, further comprising fixing said central portion to said elongated member.
3. The method of claim 1, further comprising fixing opposite faces of the flanking portions one to the other.
4. The method of claim 1, comprising compressing or straining said central portion.
5. The method of claim 1, comprising compressing or straining said central portion thereby causing thickness of the central portion to become smaller than that of said sheet before said forming.
6. The method of claim 1, comprising inserting one or more reinforcing pins into one or both of the first and second sub-structures.
7. The method of claim 1, comprising inserting one or more of said reinforcing pins into and across said second sub-structure.
8. The method of claim 1, wherein the structural element's load-supporting capacity or its bending-resistance is significantly higher than that of said elongated member.
9. The method of claim 8, wherein the load-supporting capacity or the bending-resistance is at least 2 folds higher than that of said internal member.
10. The method of claim 1, comprising coating the structural element.
11. The method of claim 10, wherein said coating comprises applying to the structural element at least one or more of a fire-resistant coating, liquid-resistant coating, scratch-resistant coating and other environmentally resistant coatings.

* * * * *